(12) United States Patent
Moorjani et al.

(10) Patent No.: US 9,456,181 B2
(45) Date of Patent: Sep. 27, 2016

(54) SMART SELECTION OF VIDEO FEEDS DURING AN ONLINE MEETING

(71) Applicant: Citrix Systems, Inc., Fort Lauderdale, FL (US)

(72) Inventors: Yogesh Moorjani, Goleta, CA (US); Ashish V. Thapliyal, Santa Barbara, CA (US)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

(21) Appl. No.: 14/613,750

(22) Filed: Feb. 4, 2015

(65) Prior Publication Data

US 2016/0227165 A1  Aug. 4, 2016

(51) Int. Cl.
*H04N 7/15* (2006.01)
*H04L 29/06* (2006.01)
*G06F 17/30* (2006.01)

(52) U.S. Cl.
CPC ............ *H04N 7/15* (2013.01); *G06F 17/3082* (2013.01); *H04L 65/4038* (2013.01)

(58) Field of Classification Search
None
See application file for complete search history.

(56) References Cited

U.S. PATENT DOCUMENTS

| | | | |
|---|---|---|---|
| 5,940,118 A * | 8/1999 | Van Schyndel | H04N 7/142 348/14.05 |
| 8,046,410 B1 * | 10/2011 | Chen | G06Q 10/103 709/204 |
| 8,171,169 B2 | 5/2012 | Bullard et al. | |
| 8,612,614 B2 | 12/2013 | Jagannath et al. | |
| 9,113,032 B1 * | 8/2015 | Vander Mey | H04N 7/15 |
| 2002/0101505 A1 * | 8/2002 | Gutta | H04N 7/15 348/14.07 |
| 2009/0282103 A1 * | 11/2009 | Thakkar | H04N 7/147 709/204 |
| 2013/0106985 A1 * | 5/2013 | Tandon | H04N 7/157 348/14.08 |
| 2014/0218464 A1 * | 8/2014 | Hartung | H04N 7/15 348/14.07 |
| 2015/0066501 A1 | 3/2015 | Thapliyal | |
| 2015/0067026 A1 | 3/2015 | Christiansen et al. | |
| 2015/0142800 A1 | 5/2015 | Thapliyal | |
| 2015/0149404 A1 | 5/2015 | Lock et al. | |
| 2015/0237303 A1 | 8/2015 | Thapliyal et al. | |

* cited by examiner

*Primary Examiner* — Stella L Woo
(74) *Attorney, Agent, or Firm* — BainwoodHuang (57) ABSTRACT

A technique smartly displays video feeds during an online meeting. The technique involves receiving, by processing circuitry, a plurality of video feeds during the online meeting. The technique further involves selecting, by the processing circuitry, a group of video feeds from the plurality of video feeds during the online meeting. The number of video feeds in the group of video feeds is less than the number of video feeds in the plurality of video feeds. Additionally, the number of video feeds in the group is at least two. The technique further involves outputting, by the processing circuitry, the group of video feeds to an online meeting participant during the online meeting. Such a technique enables the number of participants of the online meeting to be essentially unlimited, where only the video feeds deemed most significant (e.g., based on scoring) are shared during the online meeting.

21 Claims, 6 Drawing Sheets

SMART SELECTION OF VIDEO FEEDS DURING AN ONLINE MEETING

BACKGROUND

A typical web meeting shares visual data and voice data among multiple web meeting members. In particular, the web meeting members connect their respective computerized devices (e.g., desktop computer and tablets) to a web meeting server over a computer network. Once the computerized devices are properly connected, the members are able to watch visual content, as well as ask questions and inject comments to form a collaborative exchange even though the web meeting members may be scattered among remote locations.

One conventional web meeting system allows 10 members to simultaneously connect to the same web meeting. During the web meeting, the web meeting system provides a web meeting view which displays (i) the visual data from the particular member that is currently talking in a main central pane, and (ii) the visual data from each of the 10 members along a bottom pane. If a first member stops talking and a second member starts talking, the main central pane automatically switches from showing the visual data from the first member to showing the visual data from the second member. If the visual data from a member who is not currently talking is manually selected during the web meeting, the main central pane then displays the selected visual data from the member who is not currently talking during the web meeting.

SUMMARY

It should be understood that there are deficiencies to the above-described conventional web meeting system. For example, the choice of which visual data is automatically displayed in the main central pane is extremely limited in the above-described conventional web meeting system. That is, the main central pane of the above-described conventional web meeting system simply displays the visual data of one member, i.e., the visual data of the web meeting member that is currently talking Unfortunately, such operation may under emphasize the visual data from other members of significance such as members with important roles, members in key positions or that have important job titles, members that are more engaged/focused on the web meeting, and so on.

Alternatively, if the system is overridden by a static manual selection of visual data from a particular web member, the main central pane then permanently displays only that visual data. In order to change the visual data displayed in the main central pane, another manual selection must be made or the system must be reset to, again, display the visual data of the member who is currently talking.

In contrast to the above-described conventional web meeting system which either displays the visual data of the member who is currently talking or the visual data of a selected member in a static manner, improved techniques are directed to smart selection of video feeds during an online meeting. Along these lines, multiple video feeds are received and the most significant video feeds are displayed. Such operation enables the number of participants of the online meeting to be essentially unlimited, where only the video feeds deemed most significant are shared during the online meeting (e.g., the top three video feeds among more than 10 video feeds). Moreover, which video feeds are currently displayed can be change dynamically based on video feed rankings, i.e., significance scores which are assigned to the video feeds and which are dynamically updated during the online meeting. To generate such significance scores, individual sub-scores (or weights) based on a variety of criteria can be combined thus enabling each video feed to be ranked based on a combination of different criteria.

One embodiment is directed to a method of displaying video feeds during an online meeting. The method includes receiving, by processing circuitry, a plurality of video feeds during the online meeting. The method further includes selecting, by the processing circuitry, a group of video feeds from the plurality of video feeds during the online meeting. The number of video feeds in the group of video feeds is less than the number of video feeds in the plurality of video feeds. Additionally, the number of video feeds in the group is at least two. The method further includes outputting, by the processing circuitry, the group of video feeds to an online meeting participant during the online meeting.

In some arrangements, selecting the group of video feeds from the plurality of video feeds during the online meeting includes electronically generating a plurality of overall scores for the plurality of video feeds based on a set of scoring criteria. A respective overall score is electronically generated for each video feed of the plurality of video feeds and indicates a measure of significance for that video feed. In these arrangements, selecting further includes ranking the plurality of video feeds based on the plurality of overall scores to form a ranked list of video feeds, and identifying the group of video feeds from the ranked list of video feeds.

In some arrangements, identifying the group of video feeds from the ranked list of video feeds includes choosing, as the group of video feeds, N video feeds from the ranked list of video feeds. The N video feeds have the N highest overall scores on the ranked list of video feeds.

In some arrangements, the set of scoring criteria includes an out-of-session factor which is preset prior to commencement of the online meeting. In these arrangements, electronically generating the plurality of overall scores for the plurality of video feeds based on the set of scoring criteria includes calculating the respective overall score for each video feed of the plurality of video feeds based on an assessment of that video feed in view of the out-of-session factor which is preset prior to commencement of the online meeting.

In some arrangements, the set of scoring criteria includes, as the out-of-session factor, attendee role. In these arrangements, calculating the respective overall score for each video feed includes providing, as a portion of an overall score for a particular video feed, a first attendee role sub-score when the particular video feed is from a presenter-type participant of the online meeting, a second attendee role sub-score when the particular video feed is from a panelist-type participant of the online meeting, a third attendee role sub-score when the particular video feed is from an organizer-type participant of the online meeting, and a fourth attendee role sub-score when the particular video feed is from a viewer-type participant of the online meeting. Here, the first attendee role sub-score, the second attendee role sub-score, the third attendee role sub-score, and the fourth attendee role sub-score are different from each other.

In some arrangements, the set of scoring criteria includes, as the out-of-session factor, attendee significance. In these arrangements, calculating the respective overall score for each video feed includes providing, as a portion of an overall score for a particular video feed, a first attendee significance sub-score when the particular video feed is identified as being from a required participant of the online meeting, and a second attendee significance sub-score when the particular video feed is identified as being from an optional participant of the online meeting. Here, the first attendee significance sub-score and the second attendee significance sub-score are different from each other.

In some arrangements, the set of scoring criteria includes an in-session factor which is derived during the online meeting. In these arrangements, electronically generating the plurality of overall scores for the plurality of video feeds based on the set of scoring criteria includes calculating the respective overall score for each video feed of the plurality of video feeds based on an assessment of that video feed in view of the in-session factor which is derived during the online meeting.

In some arrangements, the set of scoring criteria includes, as the in-session factor, a trying-to-speak measure. In these arrangements, calculating the respective overall score for each video feed includes providing, as a portion of an overall score for a particular video feed, a first trying-to-speak sub-score when the particular video feed is identified as being from a participant of the online meeting who is trying to speak, and a second trying-to-speak sub-score when the particular video feed is identified as being from a participant of the online meeting who is not trying to speak. Here, the first trying-to-speak sub-score and the second trying-to-speak sub-score are different from each other.

In some arrangements, the set of scoring criteria includes, as the in-session factor, a postural-change measure. In these arrangements, calculating the respective overall score for each video feed includes providing, as a portion of an overall score for a particular video feed, a first postural-change sub-score when the particular video feed is identified as being from a participant of the online meeting whose posture is changing, and a second postural-change sub-score when the particular video feed is identified as being from a participant of the online meeting whose posture is not changing. Here, the first postural-change sub-score and the second postural-change sub-score are different from each other.

In some arrangements, the set of scoring criteria includes, as the in-session factor, an unmute-transition measure. In these arrangements, calculating the respective overall score for each video feed includes providing, as a portion of an overall score for a particular video feed, a first unmute-transition sub-score when the particular video feed is identified as being from a participant of the online meeting who is unmuting, and a second unmute-transition sub-score when the particular video feed is identified as being from a participant of the online meeting who is not unmuting. Here, the first unmute-transition sub-score and the second unmute-transition sub-score are different from each other.

In some arrangements, the set of scoring criteria includes, as the in-session factor, a number-of-people-in-view measure. In these arrangements, calculating the respective overall score for each video feed includes providing, as a portion of an overall score for a particular video feed, a first number-of-people-in-view sub-score when the particular video feed includes a first number of people in view, and a second number-of-people-in-view sub-score when the particular video feed includes a second number of people in view. Here, the first number-of-people-in-view sub-score and the second number-of-people-in-view sub-score are different from each other.

In some arrangements, the set of scoring criteria includes, as the in-session factor, a quality-of-video-feed measure. In these arrangements, calculating the respective overall score for each video feed includes providing, as a portion of an overall score for a particular video feed, a first quality-of-video-feed sub-score when the particular video feed has poor quality, and a second quality-of-video-feed sub-score when the particular video feed has high quality. Here, the first quality-of-video-feed sub-score and the second quality-of-video-feed sub-score are different from each other.

In some arrangements, the set of scoring criteria includes (i) an out-of-session factor which is preset prior to commencement of the online meeting and (ii) an in-session factor which is derived during the online meeting. In these arrangements, electronically generating the plurality of overall scores for the plurality of video feeds based on the set of scoring criteria includes calculating the respective overall score for each video feed of the plurality of video feeds based on an assessment of that video feed in view of (i) the out-of-session factor which is preset prior to commencement of the online meeting and (ii) the in-session factor which is derived during the online meeting.

In some arrangements, the set of scoring criteria includes, as out-of-session factors, (i) attendee role and (ii) attendee significance. In these arrangements, the set of scoring criteria further includes, as in-session factors, (i) a trying-to-speak measure, (ii) a postural-change measure, (iii) an unmute-transition measure, (iv) a number-of-people-in-view measure, and (v) a quality-of-video-feed measure.

In some arrangements, calculating the respective overall score for each video feed of the plurality of video feeds includes, for each video feed of the plurality of video feeds, electronically generating multiple sub-scores for that video feed and aggregating the multiple sub-scores for that video feed together to produce, as the respective overall score for that video feed, a sum of the multiple sub-scores.

In some arrangements, the method further includes, during a series of predefined time intervals of the online meeting, electronically generating new pluralities of overall scores for the plurality of video feeds based on the set of scoring criteria, ranking the plurality of video feeds based on the new pluralities of overall scores to form new ranked lists of video feeds, and identifying new groups of video feeds from the new ranked lists of video feeds.

In some arrangements, the method further includes, during the series of predefined time intervals of the online meeting, outputting the new groups of video feeds to the online meeting participant to periodically change which video feeds are rendered to the online meeting participant during the online meeting.

In some arrangements, selecting the group of video feeds from the plurality of video feeds during the online meeting includes simultaneously forming multiple ranked lists of video feeds based on different sets of scoring criteria; identifying, for display on a first location of a display screen, a first set of video feeds from a first ranked list of video feeds; and identifying, for display on a second location of the display screen, a second set of video feeds from a second ranked list of video feeds. Accordingly, the video feeds displayed to the user in different screen areas are prioritized using different ranking techniques.

Another embodiment is directed to an electronic apparatus which includes a communications interface, memory, and control circuitry which is coupled to the communications interface and the memory. The memory stores instructions which, when carried out by the control circuitry, cause the control circuitry to:
(A) receive a plurality of video feeds through the communications interface during an online meeting,
(B) select a group of video feeds from the plurality of video feeds during the online meeting, the number of video feeds in the group of video feeds being less than the number of video feeds in the plurality of video feeds, and the number of video feeds in the group being at least two, and (C) output the group of video feeds to an online meeting participant during the online meeting.

Yet another embodiment is directed to a computer program product having a non-transitory computer readable medium which stores a set of instructions to display video feeds during an online meeting. The set of instructions, when carried out by computerized circuitry, cause the computerized circuitry to perform a method of:

(A) receiving a plurality of video feeds during an online meeting;

(B) selecting a group of video feeds from the plurality of video feeds during the online meeting, the number of video feeds in the group of video feeds being less than the number of video feeds in the plurality of video feeds, and the number of video feeds in the group being at least two; and (C) outputting the group of video feeds to an online meeting participant during the online meeting.

It should be understood that, in the cloud context, at least some of the computerized circuitry can be formed by remote computer resources distributed over a network. Such a computerized environment is capable of providing certain advantages such as distribution of hosted services and resources (e.g., software as a service, platform as a service, infrastructure as a service, etc.), enhanced scalability, etc.

Other embodiments are directed to electronic systems and apparatus, processing circuits, computer program products, and so on. Some embodiments are directed to various methods, electronic components and circuitry which are involved in smart selection of video feeds during an online meeting.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to smart selection of video feeds during an online meeting. Along these lines, multiple video feeds are received and the most significant video feeds are displayed. Such operation enables the number of participants of the online meeting to be essentially unlimited, where only the video feeds deemed most significant are shared during the online meeting. Moreover, which video feeds are currently displayed can be change dynamically based on video feed rankings, i.e., significance scores which are assigned to the video feeds and which are dynamically updated during the online meeting. To generate such significance scores, individual sub-scores based on a variety of criteria can be combined thus enabling each video feed to be ranked based on a combination of different criteria.

Figure 1:
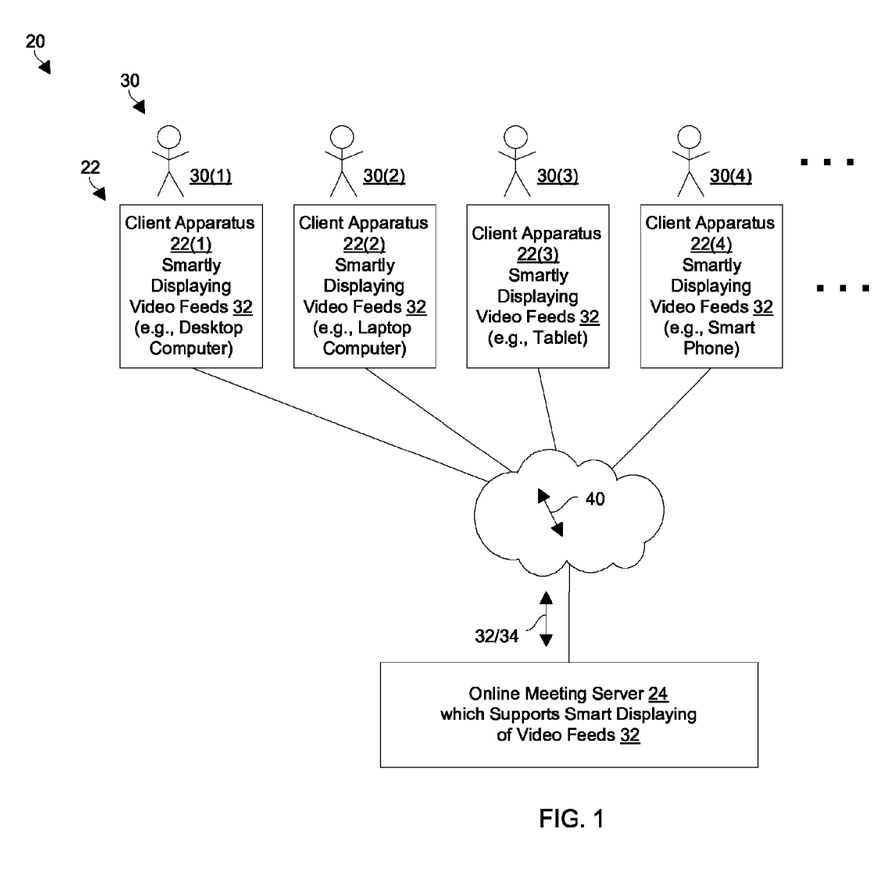
FIG. 1 is a block diagram of an electronic setting which smartly displays video feeds of participants of an online meeting.

FIG. 1 is a block diagram of an electronic setting 20 which smartly displays video feeds of participants of an online meeting. The electronic setting 20 includes client apparatus 22(1), 22(2), 22(3), 22(4), ... (collectively, client apparatus 22), an online meeting server 24, and communications medium 26 which operate together in a collaborative manner to enable users 30, i.e., online meeting participants, to exchange information during online meetings.

Each client apparatus 22 is constructed and arranged to perform useful work on behalf of a particular user 30. For example, the client apparatus 22(1) may be a desktop computer which is operated by a user 30(1), the client apparatus 22(2) may be a laptop computer which is operated by a user 30(2), the client apparatus 22(3) may be a tablet which is operated by a user 30(3), the client apparatus 22(4) may be a smart phone which is operated by a user 30(4), and so on. As will be explained in further detail below, the client apparatus 22 are equipped to smartly display video feeds 32 to their respective users 30 during online meetings.

The online meeting server 24 is constructed and arranged to host online meetings among the users 30 via the client apparatus 22. In particular, the online meeting server 24 is constructed and arranged to receive video feeds 32 and audio feeds 34 from the client apparatus 22, and provide video feeds 32 and audio feeds 34 to the client apparatus 22 during the online meetings. In some arrangements, the online meeting server 24 is equipped with an online meeting engine (i.e., specialized hardware) which is configured to perform enhanced graphics operations to process the video feeds 32 and enhanced audio/mixing operations to process the audio feeds 34.

The communications medium 26 is constructed and arranged to connect the various components of the electronic setting 20 together to enable these components to exchange electronic signals 40 (e.g., see the double arrow 40). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, cellular communications, plain old telephone service (POTS) communications, combinations thereof, etc.

During operation, the users 30 are able to connect their respective client apparatus 22 to the online meeting server 24 to form online meetings. For each online meeting, the online meeting server 24 shares video feeds 32 and audio feeds 34 received from the participating client apparatus 22. As a result, the users 30 are able to view each other, as well as verbally interact for collaborative online meetings even though the users 30 may be separated by relatively large distances.

During such operation, each client apparatus 22 is equipped to smartly display only a subset of the available video feeds 32 that are available. As will be explained in further detail shortly, each video feed 32 is scored based various heuristics, i.e., scoring criteria including out-of-session factors and in-session factors. Once the video feeds 32 are scored, the video feeds 32 are ranked (e.g., into a ranked list) and only a predefined number of the highest ranked video feeds 32 are outputted to the users 30 (e.g., the top three, four, six, eight, nine, etc.).

It should be understood that the highest ranked video feeds 32 may be different for each user 30. As a result, it is possible for a first user 30 to view a first group of video feeds 32 and a second user 30 to view a second group of video feeds 32 which is completely different. Alternatively, the users 30 may view the same group of video feeds 32 or groups which are only partially different.

In some arrangements, the online meeting server 24 performs all of the scoring, ranking, and outputting. In these arrangements, these operations are offloaded from the client apparatus 22 to the online meeting server 24 to the client apparatus 22 thus reducing amount of computing power needed at the client apparatus 22.

In other arrangements, each client apparatus 22 performs such scoring, ranking, and outputting. In these arrangements, these operations are offloaded from online meeting server 24 to the client apparatus 22 thus reducing amount of computing power needed at the online meeting server 24.

In yet other arrangements, the online meeting server 24 and each client apparatus 22 coordinate their operations to perform such scoring, ranking, and outputting. In these arrangements, the client apparatus 22 and the online meeting server 24 share this processing workload. Further details will now be provided with reference to FIG. 2.

Figure 2:
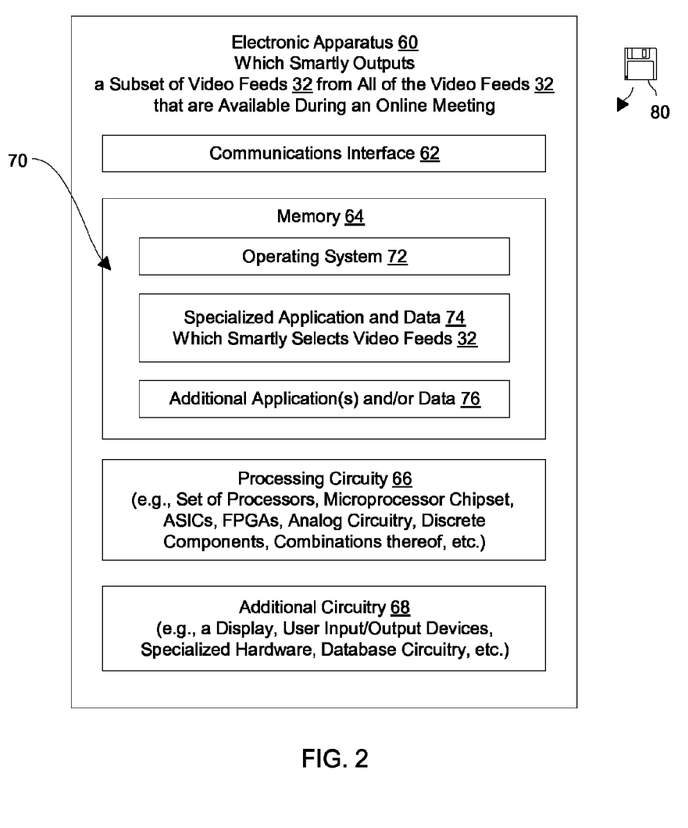
FIG. 2 is a block diagram of an apparatus of the electronic setting which smartly selects a group of video feeds to display during the online meeting.

FIG. 2 is a block diagram of an electronic apparatus 60 which smartly outputs a subset of video feeds 32 from all of the video feeds 32 that are available during an online meeting. The electronic apparatus 60 includes a communications interface 62, memory 64, processing circuitry 66, and additional circuitry 68. It should be understood that a suitable form factor for the electronic apparatus 60 is a client apparatus 22 (e.g., a desktop computer, a laptop computer, a tablet, a smart phone, etc.). Another suitable form factor for the electronic apparatus 60 is the online meeting server 24 (e.g., a mainframe, a set of blade servers, a server farm, a hardware platform providing a virtual environment and running virtual machines, distributed hardware devices, the cloud, combinations thereof, etc.).

The communications interface 62 is constructed and arranged to connect the electronic apparatus 60 to the communications medium 26 (FIG. 1). Accordingly, the communications interface 62 enables the electronic apparatus 60 to communicate with the other components of the electronic setting 20. Such communications may be line-based (e.g., copper, optical fiber, etc.) or wireless (i.e., IP-based, cellular, combinations thereof, and so on).

The memory 64 is intended to represent both volatile storage (e.g., DRAM, SRAM, etc.) and non-volatile storage (e.g., flash memory, magnetic disk drives, etc.). The memory 64 stores a variety of software constructs 70 including an operating system 72, a specialized application and data 74, and optionally additional applications and/or data 76.

The processing circuitry 66 is constructed and arranged to operate in accordance with the various software constructs 70 stored in the memory 64. In particular, the processing circuitry 66, when executing the operating system 72, manages various computerized resources of the client apparatus 22 (e.g., memory allocation, processor cycles, etc.). Additionally, the processing circuitry 66 operating in accordance with the specialized application and data 74 forms control circuitry which smartly selects video feeds 32.

It should be understood that the above-mentioned processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software to the electronic apparatus 60. The computer program product 80 has a non-transitory and non-volatile computer readable medium which stores a set of instructions to control one or more operations of the electronic apparatus 60. Examples of suitable computer readable storage media include tangible articles of manufacture and apparatus which store instructions in a non-volatile manner such as CD-ROM, flash memory, disk memory, tape memory, and the like.

The additional circuitry 68 performs other operations depending on the form factor of the electronic apparatus 60. For example, if the electronic apparatus 60 is a client apparatus 22 (also see FIG. 1), the additional circuitry 68 represents an electronic display to enable a user 30 to view smartly selected video feeds 32 during online meetings, user input/output devices such as a camera, a microphone, speakers, and so on. As another example, if the electronic apparatus 60 is the online meeting server 24 (FIG. 1), the additional circuitry 68 represents specialized hardware such as an online meeting engine (e.g., a video engine, an audio engine, combinations thereof, etc.), an online database to manage and coordinate online meetings, and so on.

During an online meeting, the electronic apparatus 60 receives video feeds 32 from all of the client apparatus 32 participating in the online meeting. The electronic apparatus 60 then selects a subset of video feeds 32 from all of the video feeds 32 in order to limit the number of video feeds 32 that are displayed to a user 30. In particular, the electronic apparatus 60 prioritizes certain video feeds 32 over others based on a set of selection criteria, and outputs only the highest prioritized video feeds 32 to the user 30, i.e., the number of video feeds 32 in the subset being at least two but less than the total number of video feeds 32. If the electronic apparatus 60 is the online meeting server 24, the electronic apparatus 60 sends just the subset of video feeds 32 to the client apparatus 22 of that user 30. Alternatively, if the electronic apparatus 60 is a client apparatus 22, the electronic apparatus 60 renders just the subset of video feeds 32 on the electronic display of the client apparatus 22.

It should be understood that this prioritization/selection process is performed individually for each user 30. Accordingly, it is possible that each user 30 views a different subset (or group) of video feeds 32.

To prioritize the video feeds 32, the electronic apparatus 60 evaluates aspects of each video feed 32 and, based on this evaluation, computes an overall score for each video feed 32. The overall score for each video feed 32 is an aggregation of sub-scores (or weights) for that video feed 32, where each sub-score for that video feed 32 is derived by assessing that video feed 32 from the perspective of a particular selection criteria.

The electronic apparatus 60 then prioritizes (or ranks) the video feeds 32 into a prioritized list of video feeds 32 based on their overall scores. For example, the video feed 32 with the highest score in the prioritized list is considered to be the most significant, and the video feed 32 with the lowest score in the prioritized list is considered to be the least significant.

Next, the top N video feeds 32 are output to the user 30 for viewing, where N is a positive integer which is at least two but less than all of the video feeds 32 (e.g., two, three, four, five, six, eight, nine, and so on). Accordingly, the client devices 22 (FIG. 1) with relatively small electronic display screens or windows display only the most significant video feeds 32 on an online meeting rather than all of the video feeds 32 of the online meeting. Moreover, extremely large online meetings (e.g., an online meeting with 20 participants) are supported without having to show all of the video feeds 32 at the same time (e.g., each client device 22 can display much fewer video feeds 32) and thus not overwhelm the users 30 and drain resources such as graphics and bandwidth resources.

Furthermore, since various aspects of each video feed 32 may change during the online meeting, the electronic apparatus 60 periodically re-evaluates these aspects (e.g., every 10 seconds, every 20 seconds, every 30 seconds, etc.) and re-computes a new overall score from new sub-scores for each video feed 32 during the online meeting. The electronic apparatus 60 then re-prioritizes the video feeds 32 based on the new overall scores to select new groups of video feeds 32 to output. Accordingly, it is possible that the video feeds 32 in the new groups may thus change over time resulting in changes in which video feeds 32 are displayed to the user 30 over the course of the online meeting.

In terms of the set of selection criteria for evaluating the video feeds 32, Table I (below) includes a list of example selection criteria which are suitable for prioritizing video feeds 32 (i.e., for generating sub-scores which are then aggregated into overall scores for each video feed 32).

TABLE I

| Selection Criteria | Description |
| --- | --- |
| Attendee Role | Apply higher sub-scores to video feeds from attendees with more important roles (e.g., Presenter, Panelist, Organizer, Viewer, etc.) |
| Social Media Activity | Apply higher sub-scores to video feeds from more participative attendees (e.g., measured by amount and type of activity on social media/blogs/web/etc.) |
| Optional/Required | Apply higher sub-scores to video feeds from required attendees than to video feeds from optional attendees |
| Job Title | Apply higher sub-scores to video feeds from attendees with higher job titles |
| Viewer-Attendee Correlations | Detect similarities between owners of video feeds and attendees and provide higher sub-scores to higher detected similarities (e.g. same title, company, industry, etc.) |
| Trying to Speak | Apply higher sub-scores to video feeds from attendees who are trying to speak |
| Posture | Apply higher sub-scores to video feeds from attendees who are changing posture to better engage the cameras |
| Unmute | Apply higher sub-scores to video feeds from attendees who are unmuting their audio feeds |
| Multitasking | Apply lower sub-scores to video feeds from attendees who are multitasking or doing other things |
| Mentioned | Apply higher sub-scores to video feeds from attendees who are mentioned during the online meeting |
| Gaze | Apply higher sub-scores to video feeds from attendees who are looking at the camera or display screen, and lower sub-scores to video feeds from attendees who are looking away from the camera or display screen |
| Number of People | Apply higher sub-scores to video feeds from individual attendees and lower sub-scores to video feeds from large groups of attendees |

TABLE I-continued

| Selection Criteria | Description |
| --- | --- |
| Quality | Apply higher sub-scores to video feeds with higher quality and lower sub-scores to video feeds with poorer quality |

Attendee Role

Each user (or online meeting attendee) 30 may be assigned a role to enable the electronic apparatus 60 to generate a role sub-score for the video feed 32 from that user 30. For example, each user 30 can be assigned a role identifier or classification such as Presenter, Panelist, Organizer, Viewer, and so on. Each role identifier may have a weight or significance associated with it. For example, Organizer or Panelist of the meeting may have a higher priority than Viewer when it comes to displaying video feeds 32. This is based on the assumption that the Organizer/Panelist is more likely to be center of attention in the online meeting. The role identifier may be predefined by each user 30, or by designated users 30 (e.g., an organizer or panelist). Such information can be gathered from an online meeting agent/application running on a client device 22 or from any other application used to share an invite to the online meetings (e.g., a calendar application, an email application, etc.).

Social Media Activity

The video feed 32 from each user 30 may be assigned a social media activity sub-score based on a measure of that user's social media activity. Social/web/blog activity can be measured in several ways:

1. First, it should be understood that people who tend to use social media and blogging systems tend to be very active collaborators. That is, participation and collaboration activity share some space with personality traits based on the assumption that "if you are more active on your professional social networks, you are more likely to be an active contributor to meetings you are part of". Accordingly, social media activity sub-scores can be provided to assist in prioritization of video feeds 32.

2. Moreover, a determination can be made of each user's areas of interest/expertise from your social posts (subject to user permission) and, if there are correlations between those and the meeting subject, the electronic apparatus 60 uses that as a heuristic to bump up the social media activity sub-scores of the video feeds 32 of those users 30.

Optional/Required

If a user 30 is a required attendee for an online meeting, that user 30 is given a higher significance sub-score compared to another user 30 is listed as optional in the meeting. This is based on the assumption that if someone is required for an online meeting, he/she is more likely to be an active contributor.

Job Title

The video feed owner's job title can be used in the following ways to determine a job title sub-score:

1. Correlation between job title and meeting title: Assuming the user 30 is more likely to be an active participant in an online meeting if the meeting concerns his/her job/role/etc. in the organization. Accordingly, the electronic apparatus 60 looks for relationships between the user's job role and the meeting subject. This correlation can be found by doing a keyword match between synonyms and closely related words for the user's job description and meeting subject.

2. Job Title Rank: The user's job title rank can also be used to determine the user's job title sub-score. For example, if a user 30 is the CEO of the company that user's job title sub-score gets bumped up.

Viewer-Attendee Correlations

Priority of camera feeds can also be customized per viewer. For example: If a user 30 is connected to one or more of meeting attendees using his/her social network, the electronic apparatus 60 bumps up the viewer-attendee sub-score for that user 30. As a result, particular users 30 are more likely to view other users 30 that they closely correlate or that they routinely communicate with. "Viewer attendees' correlation" can also be applied to some of the above-mentioned heuristics like "Title Rank", "Social Activity Topics and Meeting Subject Correlation". Furthermore, correlations between the users 30 of a company and be highly correlated with particular colleagues/competitors/business partners, and so on.

Trying to Speak

If a user 30 is speaking, the electronic apparatus 60 increases the trying-to-speak sub-score of the video feed 32 from that user 30. Along these lines, there are times when someone is trying to speak in a discussion, and that person may start by using "non-lexical conversation sounds" or interjections (um, uh, humm). This acts as indicators that the user 30 is trying to speak. The electronic apparatus 60 uses these interjections as one of the heuristics to determine the trying-to-speak sub-scores of the video feeds 32 from the users 30.

Posture

The electronic apparatus 60 is further constructed and arranged to use posture as a measure of user engagement in an online meeting. There are two parts to this heuristic. One where the user has predetermined "lean forward" v/s "lean back" posture states which are feed into the posture heuristic. In addition, the electronic apparatus 60 checks the posture of a person just before he/she engages in a conversation in the meeting and use that as a guide the next time. As a result, the electronic apparatus 60 is able to effectively provide posture-based sub-scores for the video feed 32 of each user 30.

Unmute

If a users is muted and then unmutes in an online meeting (e.g., by toggling a mute button), that operation serves as a pointer that the user 30 wants to speak. This is used as a trigger for the electronic apparatus 60 to bump up the unmuting sub-score of that user 30. In addition, the electronic apparatus 60 is able to check mouse clicks or touchscreen gestures that a user 30 makes (e.g., unmuting self, resizing an application window, etc.) just before that user 30 engages in a conversation in the online meeting and uses that as a guiding principle next time.

Multitasking

The currently active application is another heuristic that the electronic apparatus 60 uses to prioritize video feeds 32. In particular, the electronic apparatus 60 generates multitasking sub-scores for video feeds 32 based on engagement of the users 30. If user 30 is not a presenter in an online meeting and is actively working with another application on his/her computer, such activity lowers the multitasking sub-score of the video feed 32 from that user 30. Additionally, when the user 30 re-focuses back to the online meeting application, the electronic apparatus 60 increases the multitasking sub-score of the video feed 32 from that user 30.

Mentioned

If your name is mentioned in the online meeting, the electronic apparatus 60 increases the mentioned sub-score of the video feed 32 from that user 30. Here, the electronic apparatus 60 may leverage off of speech to text circuitry within the electronic apparatus 60.

Gaze

If a user 30 is looking far away from the screen/webcam or the user's face is not in the picture, the electronic apparatus 60 lowers the gaze sub-score of that user 30. However, if the user 30 turns back to the webcam or the user's face returns into view, the electronic apparatus 60 increases the gaze sub-score of that user 30.

Number of People

The electronic apparatus 60 is constructed and arranged to output a number-of-people sub-score for each video feed 32 based on the number of people in that video feed 32. For example, if there are too many people in the video feed 32 and each person is very small, the electronic apparatus 60 may significantly lower the number-of-people sub-score for that video feed 32. However, if there is just one person in the video fed 32, the electronic apparatus 60 may increase the number-of-people sub-score for that video feed 32.

Quality

The electronic apparatus 60 is constructed and arranged to output a quality sub-score for each video feed 32 based on the quality of that video feed 32. For example, if the quality of the video feed 32 is bad (e.g., stuttering, low resolution, fuzzy, suboptimal face size, etc,), the electronic apparatus 60 lowers the quality sub-score for that video feed 32.

It should be understood that a variety of other selection criteria are suitable for use in generating meaningful sub-scores for video feeds 32 to enable the electronic apparatus 60 to smartly prioritize the video feeds 32 for viewing. Since the sub-scores and the overall scores may vary for each viewing user 30, each viewing user 30 may view a different group of video feeds 32, i.e., the most significant video feeds 32 for that user 30 thus improving the user experience for each user 30.

It should be further understood that some of the selection criteria are out-of-session heuristics while other selection criteria are in-session heuristics. That is, some selection criteria (out-of-session heuristics) involve evaluating video feed aspects which are pre-set or defined outside of online meetings. On the other hand, other selection criteria (in-session heuristics) involve evaluating video feed aspects which may change during online meetings.

For the out-of-session heuristics, the sub-scores can be derived just once for an online meeting and then re-used when re-calculating new overall scores. For example, in the table above, aspects such as attendee role, social media activity, optional/required, job title, and viewer-attendee correlations can be ascertained and measured before the online meeting and thus sub-scored (or weighted) just once without any re-sub-scoring during the online meeting.

However, for the in-session heuristics, new sub-scores are repeatedly derived an online meeting. For example, in the table above, aspects such as trying to speak, posture, unmute, multitasking, mention, gaze, number of people, and quality can be ascertained and measured in an ongoing manner during the online meeting. Further details will now be provided with reference to FIG. 3.

Figure 3:
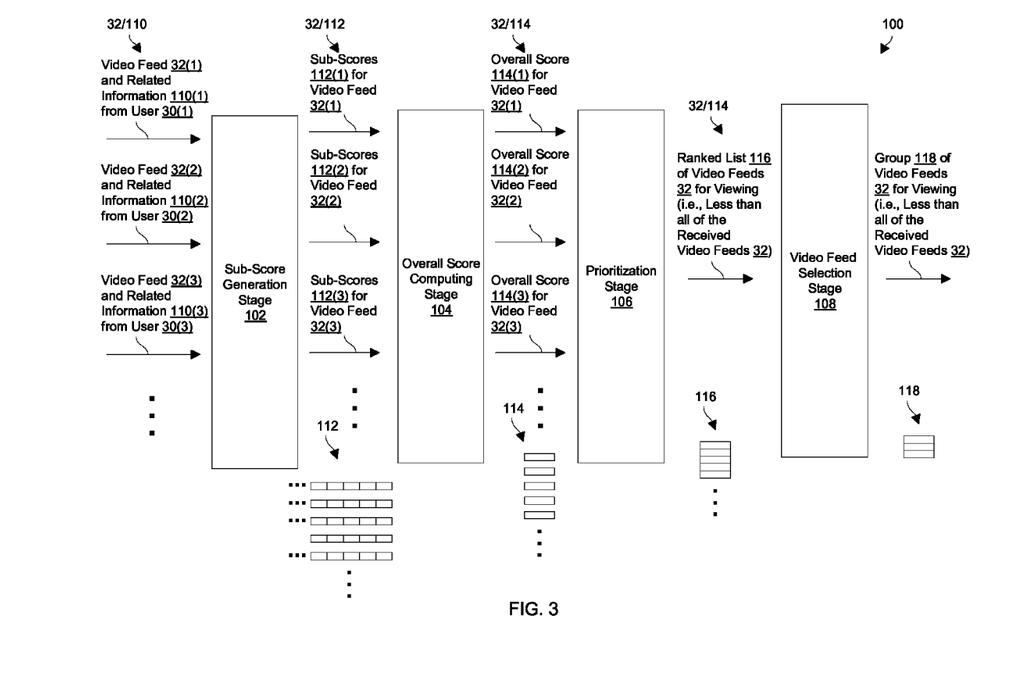
FIG. 3 is a block diagram illustrating a process of generating a ranked list of video feeds for use in smartly selecting video feeds.

FIG. 3 illustrates a process 100 for generating a ranked list of video feeds 32 for use in smartly selecting video feeds 32 for display during an online meeting. The process 100 is divided into different stages (or phases) which are arranged in a pipelined configuration: a sub-score generation stage 102, an overall score computing stage 104, a prioritization stage 106, and a video feed selection stage 108. In some arrangements, each stage is formed by separate dedicated circuitry (e.g., specialized hardware) that performs a particular operation. In other arrangements, one or more of the stages is formed by processing circuitry which executes specialized code to form that stage or those stages (e.g., see the specialized application and data 74 in FIG. 2).

The sub-score generation stage 102 receives the video feeds 32 and related information 110 (e.g., role identifiers, job title data, mute settings, etc., also see Table I) from all of the users 30. In particular, the sub-score generation stage 102 obtains a video feed 32(1) and related information 110(1) from user 30(1), a video feed 32(2) and related information 110(2) from user 30(2), a video feed 32(3) and related information 110(3) from user 30(3), and so on. The sub-score generation stage 102 then generates a set of sub-scores 112(1), 112(2), 122(3), ... (collectively, sets of sub-scores 112) for each video feed 32 based on an evaluation of that video feed 32 in accordance with a set of selection criteria (e.g., see the specialized application and data 74 in FIG. 2 and Table I above). In some arrangements, each sub-score 112 is a numerical value (or weight) indicating an incremental measure of significance to the user 30. In some arrangements, the sub-scores 112 are normalized so that they only need to be generated once during the online meeting.

Next, the overall score computing stage 104 receives the sets of sub-scores for each video feed 32 and provides an overall score 114(1), 114(2), 114(3), ... (collectively, overall scores 114) for each video feed 32. Each overall score 114 is a numerical value (or weight) indicating an overall measure of significance of a particular video feed 32 to the user 30.

The prioritization stage 106 then prioritizes the video feeds 32 into a ranked list 116 based on the overall scores 114 for the video feeds 32. The video feed 32 ranked highest on the list 116 is deemed to have the most significance to the user 30, and the video feed 32 ranked lowest on the list 116 is deemed to have the least significance to the user 30.

Subsequently, the video feed selection stage 108 choses, as a group 118 of video feeds 32 to output to the user 30, N video feeds from the ranked list 116. The selected group 118 of N video feeds 32 has the N highest overall scores 32 on the ranked list 116 (e.g., where N is two, three, four, five, six, eight, nine, etc.). Further details will now be provided with reference to FIGS. 4 and 5.

Figure 4:
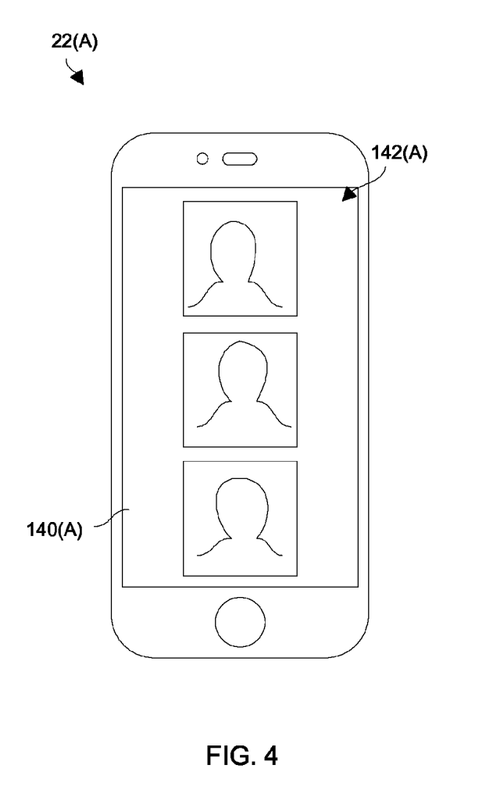
FIG. 4 is a view of a display of a first client apparatus of the electronic setting.
Figure 5:
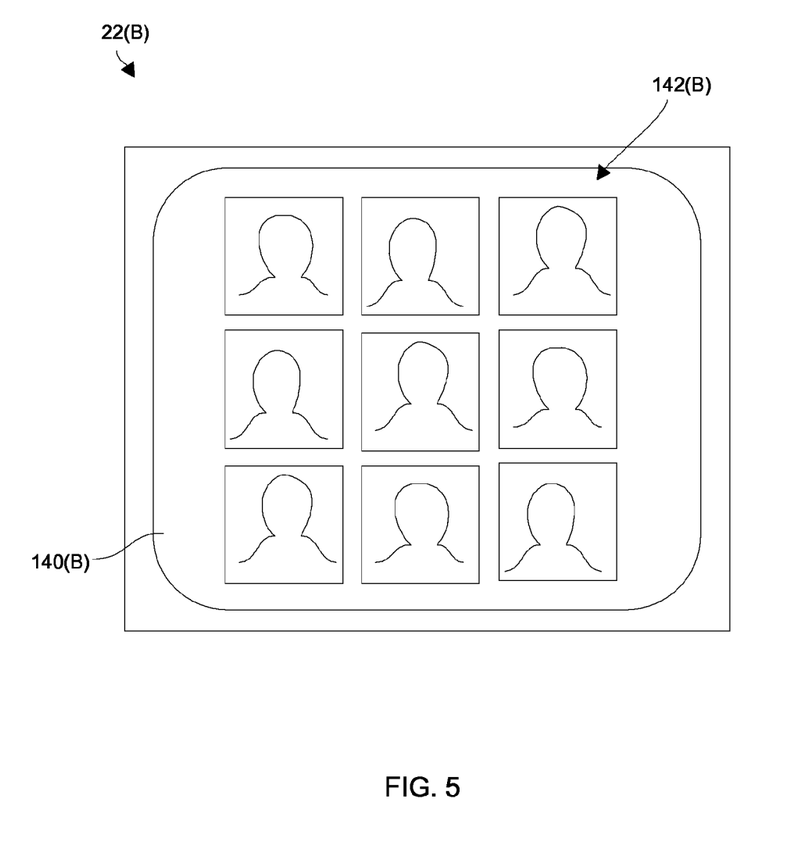
FIG. 5 is a view of a display of a second client apparatus of the electronic setting.

FIGS. 4 and 5 show various layouts for displaying a group 118 of video feeds 32 where the group 118 includes less than all of the video feeds 32 that are available during an online meeting. FIG. 4 shows an electronic display screen 140(A) of a client device 22(A) which has a relatively small area (e.g., a touch screen of a smart phone). FIG. 5 shows an electronic display screen 140(B) of a client device 22(B) which has a somewhat larger area (e.g., a touch screen of a smart phone). Recall that the video feed selection process 100 (FIG. 3) can be performed for the client devices 22(A), 22(B) by the online meeting server 24 (FIG. 1) or by the client devices 22(A), 22(B) themselves.

As shown in FIG. 4, the electronic display screen 140(A) of the client device 22(A) renders, as the subset of video feeds 32, three video feeds 32 arranged in a column 142(A) during an online meeting. These video feeds 32 are less than all of the video feeds 32 of the online meeting and are selected based on a set of selection criteria.

Periodically (e.g., every several seconds), the available video feeds 32 of the online meeting are re-evaluated (e.g., see the scoring process 100 in FIG. 3) and re-prioritized. Accordingly, during the online meeting, the particular video feeds 32 that are rendered on the electronic display screen 140(A) may change. As a result, the client device 22(A) displays the most significant video feeds 32 to the user 30 during the online meeting thus enhancing the user's experience.

Similarly, as shown in FIG. 5, the electronic display screen 140(B) of the client device 22(B) renders, as the subset of video feeds 32, an array of video feeds 32 (e.g., three rows and three columns) during an online meeting. These video feeds 32 are less than all of the video feeds 32 of the online meeting and are selected based on a set of selection criteria. Other array dimensions are suitable for use as well (e.g., 2×2, 2×3, 3×4, and so on).

It should be understood that, in some arrangements, the video feeds 32 displayed in different areas of the screens 140(A), 140(B) are prioritized using different ranking techniques. That is, in these arrangements, the processing circuitry 66 makes use of multiple ranked lists and corresponding display locations. For example, a first region at the top of the screen 140(A) in FIG. 4, may display a video feed prioritized based on a first set of heuristics (e.g., combinations of attendee role sub-score, job title sub-score, etc.) while another region below the first region concurrently displays video feeds prioritized based on a different set of heuristics (e.g., combinations of posture sub-score, unmute sub-score, and quality sub-score, etc.). As another example, a particular row (or column, etc.) of the screen 140(B) in FIG. 5 may contain video fees prioritized based on a first set of heuristics while another row (or column, etc.) contemporaneously displays video feeds prioritized based on a different set of heuristics (e.g., combinations of posture sub-score, unmute sub-score, and quality sub-score, etc.). The processing circuitry 66 can make sure that the same video feed is not inadvertently displayed more than once on the same screen. In some arrangements, the particular screen locations and/or ranking techniques are customizable by each user 30.

Regularly (e.g., every several seconds), the available video feeds 32 of the online meeting are re-evaluated (e.g., see the scoring process 100 in FIG. 3) and re-prioritized for rendering on the screen 140(B). Accordingly, during the online meeting, the particular video feeds 32 that are rendered on the electronic display screen 140(B) may change. Thus, the client device 22(B) displays the most significant video feeds 32 to the user 30 during the online meeting thus enhancing the user's experience. Further details will now be provided with reference to FIG. 6.

Figure 6:
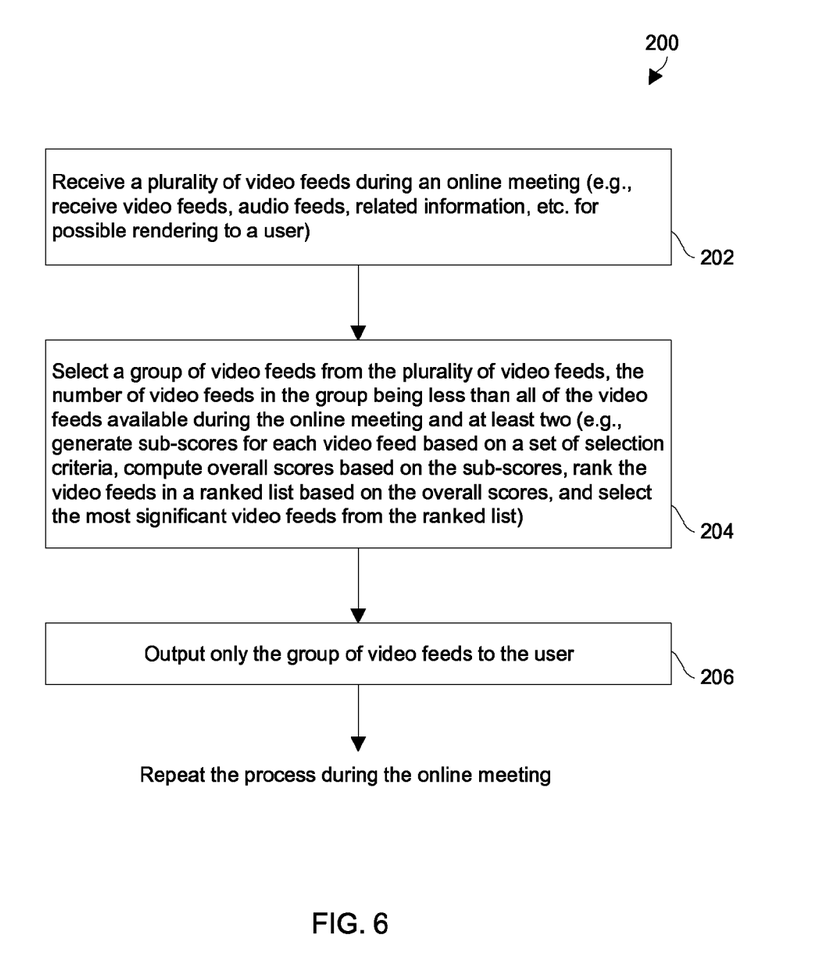
FIG. 6 is a flowchart of a procedure which is performed during the online meeting.

FIG. 6 is a flowchart of a procedure 200 which is performed by an electronic apparatus during an online meeting to display less than all of the video feeds 32 are available during the online meeting. At 202, the electronic apparatus receives a plurality of video feeds 32 during the online meeting. It should be understood that the client device 22 of the user may have limited area and thus not be suitable for displaying all of the video feeds 32 at once (e.g., see FIGS. 4 and 5). Here, the electronic apparatus further receives other information such as audio feeds and related information (e.g., attendee roles, job titles, other significance metrics and heuristics, etc.).

At 204, the electronic apparatus selects a group of video feeds from the plurality of video feeds during the online meeting. The number of video feeds in the group of video feeds is less than the number of video feeds in the plurality of video feeds, and the number of video feeds in the group being at least two. In particular, the electronic apparatus generates a plurality of overall scores 116 (from sub-scores 114) for the plurality of video feeds 32 based on a set of scoring criteria. That is, a respective overall score 116 is electronically generated for each video feed 32 of the plurality of video feeds and indicates a measure of significance for that video feed 32. The electronic apparatus ranks the plurality of video feeds 32 based on the plurality of overall scores 116 to form a ranked list 118 of video feeds. The electronic apparatus then identifies the group of video feeds 32 from the ranked list 118 of video feeds 32.

At 206, the electronic apparatus outputs the group of video feeds 32 to an online meeting participant during the online meeting. In particular, only the group of video feeds 32 is provided thus preventing the viewer from being overwhelmed with too many video feeds 32 and thus enhancing the user's experience.

It should be understood that the electronic apparatus repeats the selection procedure 200 regularly during the online meeting. Accordingly, the particular video feeds 32 in the group 118 may change over time. Therefore, the most appropriate video feeds 32 are displayed to the user in an ongoing manner.

As described above, improved techniques are directed to smart selection of video feeds 32 during an online meeting. Along these lines, multiple video feeds 32 are received and the most significant video feeds 32 are displayed. Such operation enables the number of participants of the online meeting to be essentially unlimited, where only the video feeds 32 deemed most significant are shared during the online meeting (e.g., the top three video feeds 32 among more than 10 video feeds). Moreover, which video feeds 32 are currently displayed can be change dynamically based on video feed rankings, i.e., significance scores which are assigned to the video feeds and which are dynamically updated during the online meeting. To generate such significance scores, individual sub-scores (or weights) based on a variety of criteria can be combined thus enabling each video feed to be ranked based on a combination of different criteria.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic setting 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

One should appreciate that the improvements disclosed herein amount to more than merely displaying less than all of the video feeds that are available for display. Rather, particular improvements disclosed herein involve smart selection of video feeds during an online meeting where multiple video feeds are received and only the most relevant video feeds are shown to each viewer. In particular, for each viewer, a prioritization process is able to custom score each video feed based on heuristics (e.g., title or rank, department or job description, social media activity, whether the video feeds are from required or optional participants, and so on). The scores then indicate which video feeds are most relevant to that viewer and only the most relevant video feeds (e.g., the video feeds with the highest scores) are shown to that viewer. Such improvements essentially enable an unlimited number of users to attend the online meeting where only the most relevant are displayed to each viewer.

One should further appreciate that, without such techniques, device screen-size and resource considerations such as the maximum number of active camera feeds may be severely restricted due to bandwidth. In particular, this drawback may be more pronounced if the display device is a mobile device with a small screen. However, by prioritizing video feeds in real time during an online meeting, essentially an infinite number of camera feeds can be supported with a subset dynamically chosen for display. Moreover, since such selection may be custom for each viewer, the maximum number of displayed camera feeds at any given point can vary from device to device based on the device screen size and computing resource availability among other factors such as the above-mentioned heuristics.

In some arrangements, a set of heuristics ($H_i$) is used to prioritize the camera feeds. These heuristics are used to calculate a Likely Activity Score (LAS). If the display area (which is based on the viewing device capabilities) can display N videos, the N video feeds with the N highest LAS values are displayed. In such arrangements, the LAS for a given video feed is calculated as the weighted ($W_i$) sum of the individual heuristic scores ($H_i$): $LAS=\Sigma_1^n W_i H_i$, where n is the total number of heuristics. Checking of the LAS values can be re-performed periodically (e.g., 10 seconds) in order to change which video feeds are displayed, per the new scores. Such modifications and enhancements are intended to belong to various embodiments of the disclosure.

What is claimed is:

1. A method of displaying video feeds during an online meeting, the method comprising:
   receiving, by processing circuitry, a plurality of video feeds during the online meeting;
   selecting, by the processing circuitry, a group of video feeds from the plurality of video feeds during the online meeting, the number of video feeds in the group of video feeds being less than the number of video feeds in the plurality of video feeds, and the number of video feeds in the group being at least two; and
   outputting, by the processing circuitry, the group of video feeds to an online meeting participant during the online meeting;
   wherein selecting the group of video feeds from the plurality of video feeds during the online meeting includes:
      forming multiple ranked lists of video feeds based on different sets of scoring criteria;
      identifying, for display on a first location of a display screen, a first set of video feeds from a first ranked list of video feeds; and
      identifying, for display on a second location of the display screen, a second set of video feeds from a second ranked list of video feeds.

2. A method as in claim 1 wherein forming the multiple ranked lists of video feeds includes:
   electronically generating a plurality of overall scores for the plurality of video feeds based on a set of scoring criteria, a respective overall score being electronically generated for each video feed of the plurality of video feeds and indicating a measure of significance for that video feed;

ranking the plurality of video feeds based on the plurality of overall scores to form a ranked list of video feeds, and identifying a portion of the group of video feeds from the ranked list of video feeds.

3. A method as in claim 2 wherein identifying the portion of the group of video feeds from the ranked list of video feeds includes:

choosing, as the group of video feeds, N video feeds from the ranked list of video feeds, the N video feeds having the N highest overall scores on the ranked list of video feeds.

4. A method as in claim 3 wherein the set of scoring criteria includes an out-of-session factor which is preset prior to commencement of the online meeting; and wherein electronically generating the plurality of overall scores for the plurality of video feeds based on the set of scoring criteria includes:

calculating the respective overall score for each video feed of the plurality of video feeds based on an assessment of that video feed in view of the out-of-session factor which is preset prior to commencement of the online meeting.

5. A method as in claim 4 wherein the set of scoring criteria includes, as the out-of-session factor, attendee role;

wherein calculating the respective overall score for each video feed includes:

providing, as a portion of an overall score for a particular video feed, a first attendee role sub-score when the particular video feed is from a presenter-type participant of the online meeting, a second attendee role sub-score when the particular video feed is from a panelist-type participant of the online meeting, a third attendee role sub-score when the particular video feed is from an organizer-type participant of the online meeting, and a fourth attendee role sub-score when the particular video feed is from a viewer-type participant of the online meeting; and wherein the first attendee role sub-score, the second attendee role sub-score, the third attendee role sub-score, and the fourth attendee role sub-score are different from each other.

6. A method as in claim 4 wherein the set of scoring criteria includes, as the out-of-session factor, attendee significance;

wherein calculating the respective overall score for each video feed includes:

providing, as a portion of an overall score for a particular video feed, a first attendee significance sub-score when the particular video feed is identified as being from a required participant of the online meeting, and a second attendee significance sub-score when the particular video feed is identified as being from an optional participant of the online meeting; and wherein the first attendee significance sub-score and the second attendee significance sub-score are different from each other.

7. A method as in claim 3 wherein the set of scoring criteria includes an in-session factor which is derived during the online meeting; and wherein electronically generating the plurality of overall scores for the plurality of video feeds based on the set of scoring criteria includes:

calculating the respective overall score for each video feed of the plurality of video feeds based on an assessment of that video feed in view of the in-session factor which is derived during the online meeting.

8. A method as in claim 7 wherein the set of scoring criteria includes, as the in-session factor, a trying-to-speak measure;

wherein calculating the respective overall score for each video feed includes:

providing, as a portion of an overall score for a particular video feed, a first trying-to-speak sub-score when the particular video feed is identified as being from a participant of the online meeting who is trying to speak, and a second trying-to-speak sub-score when the particular video feed is identified as being from a participant of the online meeting who is not trying to speak; and wherein the first trying-to-speak sub-score and the second trying-to-speak sub-score are different from each other.

9. A method as in claim 7 wherein the set of scoring criteria includes, as the in-session factor, a postural-change measure;

wherein calculating the respective overall score for each video feed includes:

providing, as a portion of an overall score for a particular video feed, a first postural-change sub-score when the particular video feed is identified as being from a participant of the online meeting whose posture is changing, and a second postural-change sub-score when the particular video feed is identified as being from a participant of the online meeting whose posture is not changing; and wherein the first postural-change sub-score and the second postural-change sub-score are different from each other.

10. A method as in claim 7 wherein the set of scoring criteria includes, as the in-session factor, an unmute-transition measure;

wherein calculating the respective overall score for each video feed includes:

providing, as a portion of an overall score for a particular video feed, a first unmute-transition sub-score when the particular video feed is identified as being from a participant of the online meeting who is unmuting, and a second unmute-transition sub-score when the particular video feed is identified as being from a participant of the online meeting who is not unmuting; and wherein the first unmute-transition sub-score and the second unmute-transition sub-score are different from each other.

11. A method as in claim 7 wherein the set of scoring criteria includes, as the in-session factor, a number-of-people-in-view measure;

wherein calculating the respective overall score for each video feed includes:

providing, as a portion of an overall score for a particular video feed, a first number-of-people-in-view sub-score when the particular video feed includes a first number of people in view, and a second number-of-people-in-view sub-score when the particular video feed includes a second number of people in view; and wherein the first number-of-people-in-view sub-score and the second number-of-people-in-view sub-score are different from each other.

12. A method as in claim 7 wherein the set of scoring criteria includes, as the in-session factor, a quality-of-video-feed measure;

wherein calculating the respective overall score for each video feed includes:

providing, as a portion of an overall score for a particular video feed, a first quality-of-video-feed sub-score when the particular video feed has poor quality, and a second quality-of-video-feed sub-score when the particular video feed has high quality; and wherein the first quality-of-video-feed sub-score and the second quality-of-video-feed sub-score are different from each other.

13. A method as in claim 3 wherein the set of scoring criteria includes (i) an out-of-session factor which is preset prior to commencement of the online meeting and (ii) an in-session factor which is derived during the online meeting; and wherein electronically generating the plurality of overall scores for the plurality of video feeds based on the set of scoring criteria includes:

calculating the respective overall score for each video feed of the plurality of video feeds based on an assessment of that video feed in view of (i) the out-of-session factor which is preset prior to commencement of the online meeting and (ii) the in-session factor which is derived during the online meeting.

14. A method as in claim 13 wherein the set of scoring criteria includes, as out-of-session factors, (i) attendee role and (ii) attendee significance;

wherein the set of scoring criteria further includes, as in-session factors, (i) a trying-to-speak measure, (ii) a postural-change measure, (iii) an unmute-transition measure, (iv) a number-of-people-in-view measure, and (v) a quality-of-video-feed measure;

wherein calculating the respective overall score for each video feed includes:

providing, as a first portion of an overall score for a particular video feed, a first attendee role sub-score when the particular video feed is from a presenter-type participant of the online meeting, a second attendee role sub-score when the particular video feed is from a panelist-type participant of the online meeting, a third attendee role sub-score when the particular video feed is from an organizer-type participant of the online meeting, and a fourth attendee role sub-score when the particular video feed is from a viewer-type participant of the online meeting, the first attendee role sub-score, the second attendee role sub-score, the third attendee role sub-score, and the fourth attendee role sub-score being different from each other, providing, as a second portion of the overall score for the particular video feed, a first attendee significance sub-score when the particular video feed is identified as being from a required participant of the online meeting, and a second attendee significance sub-score when the particular video feed is identified as being from an optional participant of the online meeting, the first attendee significance sub-score and the second attendee significance sub-score being different from each other, providing, as a third portion of the overall score for the particular video feed, a first trying-to-speak sub-score when the particular video feed is identified as being from a participant of the online meeting who is trying to speak, and a second trying-to-speak sub-score when the particular video feed is identified as being from a participant of the online meeting who is not trying to speak, the first trying-to-speak sub-score and the second trying-to-speak sub-score being different from each other, providing, as a fourth portion of the overall score for the particular video feed, a first postural-change sub-score when the particular video feed is identified as being from a participant of the online meeting whose posture is changing, and a second postural-change sub-score when the particular video feed is identified as being from a participant of the online meeting whose posture is not changing, the first postural-change sub-score and the second postural-change sub-score being different from each other, providing, as a fifth portion of the overall score for the particular video feed, a first unmute-transition sub-score when the particular video feed is identified as being from a participant of the online meeting who is unmuting, and a second unmute-transition sub-score when the particular video feed is identified as being from a participant of the online meeting who is not unmuting, the first unmute-transition sub-score and the second unmute-transition sub-score being different from each other, providing, as a sixth portion of the overall score for the particular video feed, a first number-of-people-in-view sub-score when the particular video feed includes a first number of people in view, and a second number-of-people-in-view sub-score when the particular video feed includes a second number of people in view, the first number-of-people-in-view sub-score and the second number-of-people-in-view sub-score being different from each other, and providing, as a seventh portion of the overall score for the particular video feed, a first quality-of-video-feed sub-score when the particular video feed has poor quality, and a second quality-of-video-feed sub-score when the particular video feed has high quality, the first quality-of-video-feed sub-score and the second quality-of-video-feed sub-score being different from each other.

15. A method as in claim 3 wherein calculating the respective overall score for each video feed of the plurality of video feeds includes:

for each video feed of the plurality of video feeds, electronically generating multiple sub-scores for that video feed and aggregating the multiple sub-scores for that video feed together to produce, as the respective overall score for that video feed, a sum of the multiple sub-scores.

16. A method as in claim 3, further comprising:

during a series of predefined time intervals of the online meeting, electronically generating new pluralities of overall scores for the plurality of video feeds based on the set of scoring criteria, ranking the plurality of video feeds based on the new pluralities of overall scores to form new ranked lists of video feeds, and identifying new groups of video feeds from the new ranked lists of video feeds.

17. A method as in claim 16, further comprising:

during the series of predefined time intervals of the online meeting, outputting the new groups of video feeds to the online meeting participant to periodically change which video feeds are rendered to the online meeting participant during the online meeting.

18. A method as in claim 1 wherein forming the multiple ranked lists of video feeds based on different sets of scoring criteria includes:

electronically generating a first set of overall scores for the plurality of video feeds based on a first set of scoring criteria and creating the first ranked list of video feeds based on ranking the first set of overall scores, the first ranked list of video feeds including multiple video feeds, and electronically generating a second set of overall scores for the plurality of video feeds based on a second set of scoring criteria and creating the second ranked list of video feeds based on ranking the second set of overall scores, the second ranked list of video feeds including multiple video feeds, the first set of scoring criteria being different from the second set of scoring criteria, and the first ranked list of video feeds being different from the second ranked list of video feeds.

19. A method as in claim 18 wherein the first set of scoring criteria includes a first group of heuristics;

wherein the second set of scoring criteria includes a second group of heuristics;

wherein the second group of heuristics includes at least one heuristic that is not in the first group of heuristics; and wherein identifying the second set of video feeds from the second ranked list of video feeds includes:

detecting that a particular video feed of the second set of video feeds is in the first set of video feeds and removing the particular video feed from the second set of video feeds to prevent the particular video feed from being displayed more than once on the display screen.

20. An electronic apparatus, comprising:

a communications interface;

memory; and control circuitry coupled to the communications interface and the memory, the memory storing instructions which, when carried out by the control circuitry, cause the control circuitry to:

receive a plurality of video feeds through the communications interface during an online meeting, select a group of video feeds from the plurality of video feeds during the online meeting, the number of video feeds in the group of video feeds being less than the number of video feeds in the plurality of video feeds, and the number of video feeds in the group being at least two, and output the group of video feeds to an online meeting participant during the online meeting;

wherein the control circuitry, when selecting the group of video feeds from the plurality of video feeds during the online meeting, is constructed and arranged to:

form multiple ranked lists of video feeds based on different sets of scoring criteria;

identify, for display on a first location of a display screen, a first set of video feeds from a first ranked list of video feeds; and identify, for display on a second location of the display screen, a second set of video feeds from a second ranked list of video feeds.

21. A computer program product having a non-transitory computer readable medium which stores a set of instructions to display video feeds during an online meeting, the set of instructions, when carried out by computerized circuitry, causing the computerized circuitry to perform a method of:

receiving a plurality of video feeds during the online meeting;

selecting a group of video feeds from the plurality of video feeds during the online meeting, the number of video feeds in the group of video feeds being less than the number of video feeds in the plurality of video feeds, and the number of video feeds in the group being at least two; and outputting the group of video feeds to an online meeting participant during the online meeting;

wherein selecting the group of video feeds from the plurality of video feeds during the online meeting includes:

forming multiple ranked lists of video feeds based on different sets of scoring criteria;

identifying, for display on a first location of a display screen, a first set of video feeds from a first ranked list of video feeds; and identifying, for display on a second location of the display screen, a second set of video feeds from a second ranked list of video feeds.

* * * * *